United States Patent [19]

Bertrand

[11] Patent Number: 4,665,753

[45] Date of Patent: May 19, 1987

[54] INDUCTIVE DIFFERENTIAL PRESSURE SENSOR

[75] Inventor: Pierre Bertrand, Igny, France

[73] Assignee: Sereg, S.A., Montrouge, France

[21] Appl. No.: 673,976

[22] Filed: Nov. 23, 1984

[30] Foreign Application Priority Data

Nov. 25, 1983 [FR] France .................................. 83 18842

[51] Int. Cl.[4] ............................ G01L 7/08; G01L 9/10
[52] U.S. Cl. ....................................... 73/706; 73/708;
73/722; 336/30
[58] Field of Search ................. 73/722, 706, 708, 728;
336/30

[56] References Cited

U.S. PATENT DOCUMENTS 2,692,501 10/1954 Erwood .................................. 73/722
4,538,465 9/1985 Bianchi et al. ......................... 73/722

*Primary Examiner*—Donald O. Woodiel

*Attorney, Agent, or Firm*—Dale Gaudier

[57] ABSTRACT

A measuring diaphragm (1) separates in a pressure-tight manner two half chambers (9, 10) suitable for being respectively subjected to two pressures to be compared. In a central zone of the diaphragm (1) there are two magnetic cores (118, 127) which are disposed on opposite sides of the diaphragm in respective ones of the half chambers and which are displaced with the diaphragm when the faces of the diaphragm are subjected to different pressures. The cores are movable inside respective simple inductors (132, 133), thereby varying their impedances. By measuring this impedance variation it is possible to determine the position of the cores in the associated inductors, and consequently to establish the difference between the pressures being applied to respective faces of the measuring diaphragm (1). The above arrangement provides for automatic zero correction in an inductive differential pressure sensor.

4 Claims, 4 Drawing Figures

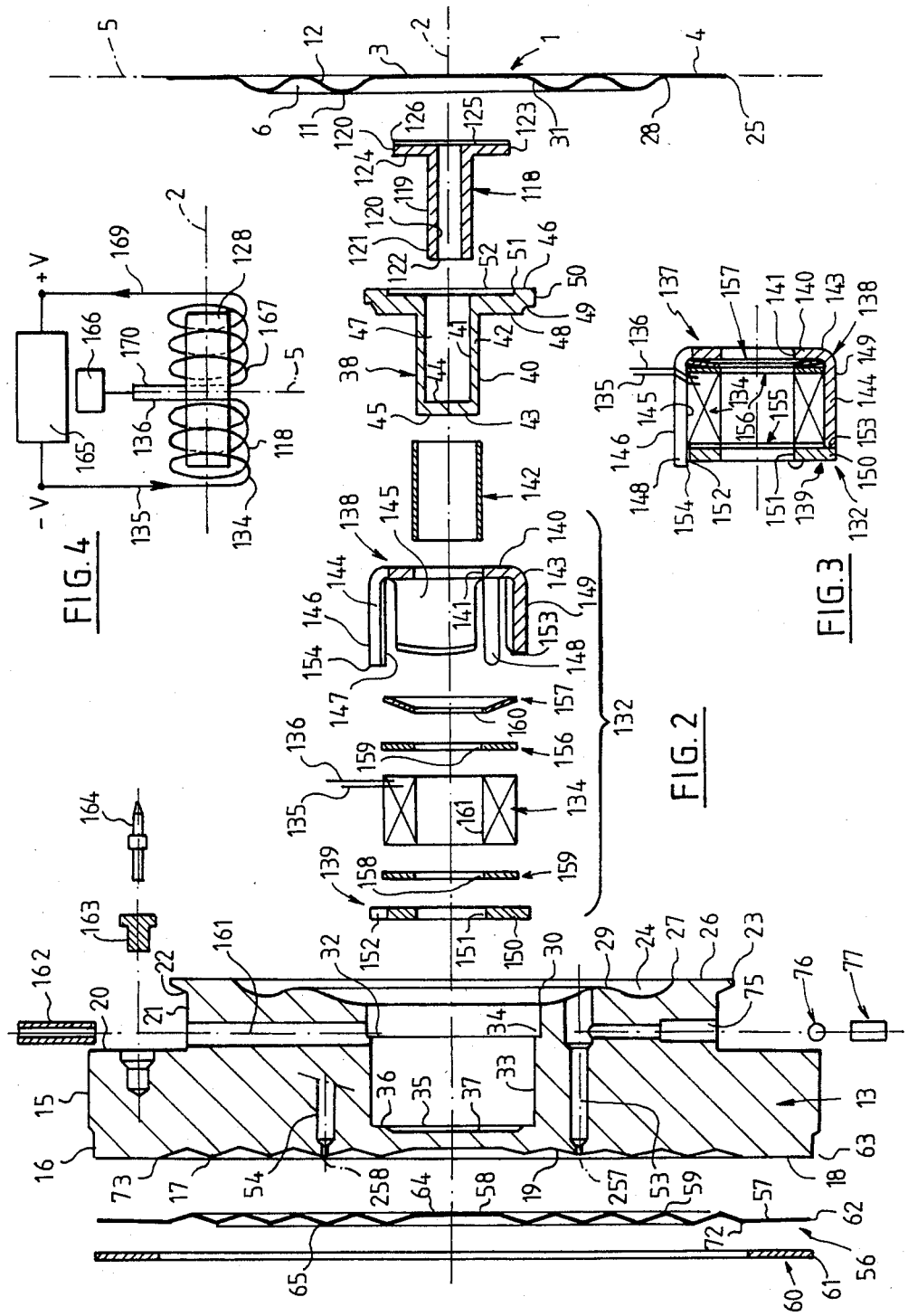

INDUCTIVE DIFFERENTIAL PRESSURE SENSOR

BACKGROUND OF THE INVENTION

The present invention relates to an inductive differential pressure sensor of the type comprising:
- a rigid body delimiting an internal chamber;
- a flexible measuring diaphragm subdividing the chamber into two half chambers which are sealed from each other;
- means for applying two pressures to be compared to respective ones of the two half chambers, said pressures being applied directly or by means of a substantially incompressible hydraulic fluid, a central zone of the diaphragm being suitable for being displaced by a value representative of the value of the difference between the two pressures and along a reference direction perpendicular to a reference plane which is fixed relative to the body and which is defined by the general plane of the diaphragm when in its reference position; and
- electromagnetic means for measuring said displacement by induction.

Such sensors are used widely, and the Applicant sells one particular embodiment thereof under the reference number 6445.

In this particular embodiment, the electromagnetic measuring means comprise:
- a magnetic core disposed in one or other of the two half chambers and fixedly mounted by means of a connection finger to the central zone of the diaphragm in such a manner that any displacement of the core in the reference direction is representative of the displacement of the central zone of the diaphragm; and
- two simple inductors fixedly mounted in the body around the magnetic core and juxtaposed in the reference direction, the dimensions and positions of the assembly being such that the further the magnetic core penetrates into one of the two inductors due to variation in the difference between the pressures to be compared, the further the core moves out from the other inductor; the difference between the two pressures to be compared thus being measured by the difference between the respective impedances, and preferably self inductances, of the two inductors.

This embodiment is perfectly satisfactory so long as it is only required to operate under substantially constant predetermined temperature conditions.

Once the temperature begins to vary, variations are observed in the measurements due to the effect of temperature on the geometrical characteristics of the various portions of the sensor due to expansion, and on the magnetic and electrical characteristics of the assembly constituted by the core, the inductors, and in some cases the adjacent parts of the body of the sensor.

Preferred embodiments of the invention provide a structure for the electromagnetic measuring means which is suitable for ensuring automatic and permanent correction of the influence of temperature on the measurement zero, and this may be achieved without significantly increasing the size or the cost of the sensor.

SUMMARY OF THE INVENTION

To this end, the present invention provides a sensor of the type generally defined above, in which the electromagnetic measuring means are disposed as follows:
- two identical magnetic cores are fixedly mounted on the central zone of the diaphragm and are symmetrically disposed on either side thereof in respective ones of the two half chambers, and are mutually aligned parallel to the reference direction;
- two identical simple inductors are fixedly mounted to the body in symmetrical positions on either side of the reference plane in mutual alignment parallel to the reference direction, each inductor being disposed about a respective one of the cores so as to present an impedance which is a function of the position of the core relative to the inductor; and
- electrical connection means for connecting the two inductors with means for determining the difference between their impedances;
- the body being at least partially symmetrical about the said reference plane.

The number of inductors remains the same as that used in the sensors already sold by the Applicant and described above, which ensures that the overall size and overall cost of the sensor in accordance with the invention are comparable to the size and cost of the prior art sensors. Further, the body may advantageously have means fixed thereto for defining respective cavities within the body around each inductor, said cavities being sealed from the internal chamber, and said means being a non-magnetic at least between the corresponding inductor and the magnetic core associated therewith.

During operation of the sensor, the inductors are thus protected from being stressed by the pressures to be compared. Thus, both inductors operate under identical pressure conditions which are substantially constant, e.g. at atmospheric pressure, and their electrical and magnetic characteristics are not influenced by the pressures to be compared.

Further, each inductor advantageously includes a frame inside the corresponding cavity and is fixed to the body inside the cavity by means of a plurality of resilient tabs which are substantially parallel to the reference direction and which are fixed between the body and the frame. The tabs are advantageously constituted as integral portions of the frame.

This disposition protects each of the inductors from mechanical stresses which could be set up by temperature variations because of different expansion characteristics between the various components constituting the sensor.

It may be observed that all the dispositions which have been described above co-operate to make a sensor in accordance with the invention as insensitive as possible to any variations in the temperature and the absolute pressure of the fluids whose pressures it is comparing.

Nevertheless, its size and manufacturing cost remain comparable to the size and cost of inductive differential pressure sensors of the prior art.

BRIEF DESCRIPTION OF THE DRAWINGS

An embodiment of the invention is described by way of example with reference to the accompanying drawings, in which:

FIG. 2 is an exploded view of a portion of the sensor, and is a section in the same plane;

FIG. 3 is a section in the same plane through one of the inductors of the sensor; and FIG. 4 is an electrical circuit diagram for use with the sensor.

DETAILED DESCRIPTION OF A PREFERRED EMBODIMENT

Figure 1:
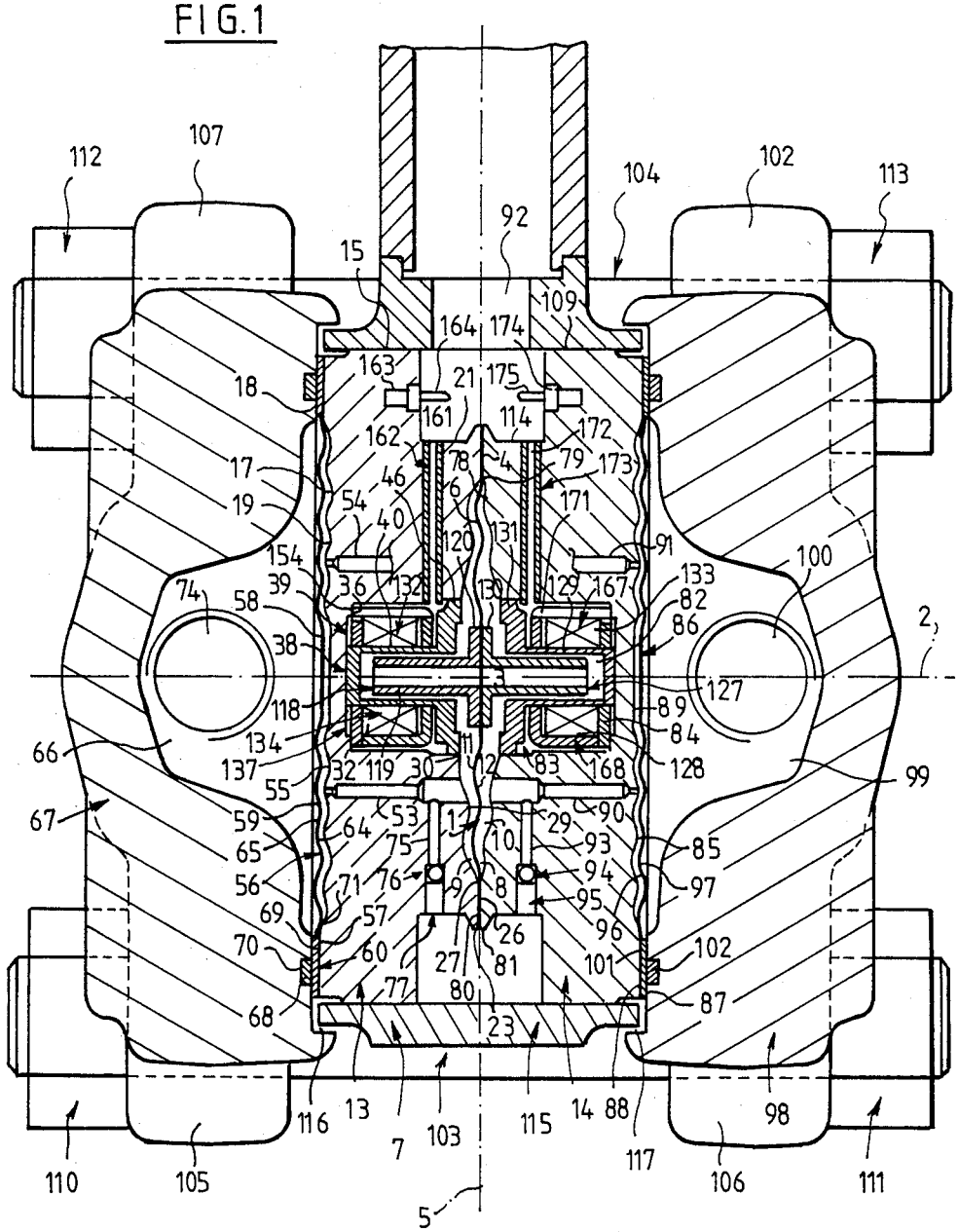
FIG. 1 is a section through a sensor in accordance with the invention on a plane of symmetry which is perpendicular to the reference planes.

Reference 1 designates a flexible measuring diaphragm. The diagphragm 1 may be made of cobalt steel, and is preferably made of a steel with a high cobalt content such as the types sold under the trademarks Phynox and Elgiloy.

When at rest, the diaphragm 1 is in the position shown in FIGS. 1 and 2, i.e. it is symmetrical about an axis 2 and has a central zone 3 in the form of a disk and a peripheral zone 4 which is annular. Both of these zones are flat and lie in the same general plane 5 which is perpendicular to the axis 2. The two zones 3 and 4 are interconnected by corrugations 6 which are likewise symmetrical about the axis 2 and which enable the zone 3 to be displaced relative to the zone 4 while remaining parallel thereto. The displacement may take place in either direction parallel to the axis 2 as is well known in the prior art.

The peripheral zone 4 of the diaphragm 1 is capped in a pressure-tight manner and is fixed to a rigid body 7 made of pressure-tight material such as stainless steel 316L. The diaphragm divides an internal chamber 8 within the body into two mutually sealed half chambers 9 and 10 to which the diaphragm presents respective faces 11 and 12 having the same area and defined by the central zone 3 and by the corrugated zone 6 which extends between central zone 3 and the peripheral zone 4.

It may be observed that the general plane 5 as embodied by the peripheral zone 4 of the diaphragm 1 is fixed relative to the body 7. In the following description, the general plane 5 as embodied by the peripheral zone 4 of the diaphragm 1, the axis 2, and the direction thereof, are taken as a reference plane, a reference axis and a reference direction respectively.

As can be seen in FIG. 1, the body 7 is constituted by two body portions 13 and 14 which (apart from specific exceptions mentioned below) are bodies of rotation about the axis 2 and are symmetrical relative to one another by reflection in the plane 5. These two body portions are assembled by being welded to the peripheral zone 4 of the diaphragm 1.

With reference to FIG. 2, the portion 13 of the body 7 is shown in greater detail. It has a peripheral outer face 15 which is cylindrical about the axis 2 and which defines the maximum transverse extent of the body relative to the axis. Going away from the plane 5, the peripheral face 15 ends in a portion of reduced diameter 16 which is likewise symmetrical about the axis 2 and leads to the outer periphery 16 of a face 17 which marks the end of the body portion 13 facing away from the internal chamber 8. The face 17 has two zones 18 and 19. The zone 18 is annular, plane, perpendicular to the axis 2, and is the portion of the face 17 which is in direct contact with the reduced diameter portion 16 of the cylindrical outer face 15. The second portion 19 of the face 17 lies within the first portion 18, intersects the axis 2, and comes closer to the reference plane 5 than does the first zone 18, with the transition being marked by circular corrugations about the axis 2.

Towards the plane 5, the outer peripheral face 15 of the body portion 13 meets the outer periphery of a plane annular face 20 which is perpendicular to the axis 2 and which faces the plane 5. The face 20 has an inner periphery which meets the outer periphery of a cylindrical portion of the body portion 13 which is of smaller diameter than the outer peripheral face 15 and than the portion of reduced diameter 16. The face 21 thus marks the end of the cylindrical face 22 which is furthest from the reference plane 5. The other end of the cylindrical face 21 terminates in an outwardly directed sloping flange face 22 whose outer rim 23 also constitutes the outer rim of a face 24 which delimits the body portion 13 towards the plane 5, i.e. which faces the diaphragm 1.

The outer rim 23 of the face 24 is circular about the axis 2 and has a diameter which lies between the diameters of the outer peripheral faces 21 and 15 of body portion 13. This diameter is essentially equal to the diameter of the outer periphery 25 of the diaphragm 1, and the body portion 13 is fixed to the diaphragm 1 by a weld between the outer periphery 25 of the diaphragm and the outer periphery 23 of the body portion face 24.

In the immediate proximity of its outer periphery 23, the face 24 has an annular zone 26 which is plane, and perpendicular to the axis 2. The inside edge 27 of the annular zone 26 is circular about the axis 2 and of substantially the same diameter as the transition 28 between the peripheral zone 4 of the diaphragm 1 and the corrugated zone 6 thereof. Thus the peripheral zone 4 of the diaphragm 1 is pressed flat against the peripheral zone 26 of the face 24. The peripheral zone 26 of the face 24 thus constitutes the zone of the body portion 13 which is closest to the reference plane 5.

Going inwards towards the axis 2 from the peripheral zone 26 of the face 24, there is an intermediate zone 29 which constitutes a region where the face 24 is further from the plane 5 than is the zone 26, and which has corrugations which are at a distance from the surface 11 of the diaphragm 1 in the corrugated region 6 when the diaphragm 1 is at rest. There is thus a half chamber 9 between the face 24 of the body portion 13 and the face 11 of the diaphragm 1. However, the intermediate zone 29 is shaped to match the corrugations of the face 11 when the diaphragm 1 is elastically deformed towards the body portion 13. When the corrugations 6 make contact with the corrugations of the intermediate zone 29 of the face 24, the diaphragm 1 has reached its deformation limit in this direction. The person skilled in the art will easily determine the shape which should be given for this purpose to the intermediate zone 29 of the face 24 as a function of the shape of the corrugations 6 in the diaphragm 1.

The inside edge 30 of the intermediate zone 29 of the face 24 is circular about the axis 2 and is of about the same diameter as the transition 31 between the corrugated zone 6 of the diaphragm 1 and the central zone 3 thereof.

This inner peripheral rim 30 of the intermediate zone 29 of the face 24 defines the edge of a central blind hold 32 therein. The central blind hole 32 is delimited inside the body portion 13 firstly by a peripheral face 33 which is cylindrical about the axis 2 and which meets the inner rim 30 of the intermediate zone 29 of the face 24 via a zone 34 of slightly larger diameter (likewise about the axis 2) and secondly by a bottom 35 having an outer peripheral zone 36 which is annular, plane, perpendicular to the axis 2, and adjacent to the peripheral face 33, and a central zone 37 in the form of a plane disk which is perpendicular to the axis 2 and which is slightly further from the reference plane 5 than the surrounding zone 36. The central disk 37 constitutes the major portion of the face 35.

As can be seen from FIG. 1, a non-magnetic insert 38, made of stainless steel type 316L for example, is fixed inside the blind hole 32, e.g. by welding to the portion 13 so as to delimit an annular cavity 39 inside the blind hole 32, said cavity being symmetrical about the axis 2 and isolated in sealed manner from the half chamber 9.

To this end, the insert 38 is shaped as follows:

a sleeve-shaped zone 40 having an inside peripheral face 41 and an outside peripheral face 42, both faces being cylindrical about the axis 2 and having diameters which are smaller than the diameter of the central zone 37 of the bottom face 35 of the blind hole 32;

a bottom zone 43 closing the inside 47 of the sleeve 40 and extending transversely relative to the axis 2 at the end of the sleeve which is distant from the plane 5; the bottom zone 43 has two plane parallel faces 44 and 45 which are disk shaped and perpendicular to the axis 2 with the face 44 inside the sleeve 40 and contiguous with the inside peripheral face 41 thereof, while the plane disk face 45 is outside the sleeve 40 and is contiguous with the outside peripheral face 42 thereof; as can be seen in FIG. 1, the insert 38 has its face 45 adjacent to the central zone 37 of the bottom face 35 of the blind hole 32;

a collar-shaped zone 46 extending the end of the sleeve 40 which is closer to the plane 5 in an outward direction relative to the axis 2; leaving the inside 47 of the sleeve 40 completely free for access from the plane 5 and in a direction parallel to the axis 2 so that the inside 47 of the sleeve 40 formed an integral part of the half chamber 9; to this end, the collar 46 has a plane annular face 48 facing away from the plane 5 which is perpendicular to the axis 2 and which is contiguous with the outer peripheral face 42 of the sleeve 40; the outer rim of the face 48 has a stepped zone 49 which is symmetrical about the axis 2 and which meets an outer cylindrical surface 50 constituting the outer peripheral face of the collar 46; the diameter of the cylindrical face 50 about the axis 2 is substantially identical to the diameter of the zone 34 in the peripheral face 33 of the blind hole 32; the face 50 is delimited on its side away from the plane 5 by the step 49 and is delimited on its side towards the plane 5 by meeting the outer periphery of an annular plane face 51 which is perpendicular to the axis 2 and which faces the plane 5; the face 51 has an inside diameter which is intermediate between the diameter of the cylindrical face 50 and the inside peripheral face 41 of the sleeve 40; a further annular face 52 which is likewise plane and perpendicular to the axis 2 is stepped back from the face 51 and connects the inside peripheral face 41 of the sleeve 40 to the annular face 51.

As can be seen from FIG. 1, the junction between the face 51 of the collar 46 and the outer peripheral face 50 thereof coincides substantially with the inside periphery 30 of the immediate zone 29 of the face 24 of the body portion 13. The insert 38 is welded in a pressure-tight manner to the body portion 13 at this junction, thereby isolating the cavity 39 from the half chamber 9 while enabling the half chamber 9 to extend inside the sleeve 40.

More exactly, the half chamber 9 is delimited in pressure tight manner by the face 11 of the diaphragm 1, by the intermediate zone 29 of the face 24 of the body portion 13, by the faces 51 and 52 of the collar 46 of the insert 38, by the inside peripheral face 41 of the sleeve 40, and by the inside face 44 of the bottom 43 thereof. The peripheral zone 4 of diaphragm 1 may be considered to a good approximation to be in perfectly flat contact with the peripheral zone 26 of the face 24 of the body portion 13.

A network of ducts such as 53 and 54 open out into the half chamber 9 thus defined, and more precisely into the intermediate zone 29 of the face 24 of the body portion 13. The other end of the ducts open out in the face 17 of the body portion 13 and thus constitute an exception to the body portion 13 being a perfect body of rotation about the axis 2 since the ducts are disposed at intervals around the central blind hole 32. In the example illustrated, each duct is generally rectilinear with its own axis such as 257 and 258 parallel to the axis 2. The respective axes such as 257 and 258 of the various ducts such as 53 and 54 are preferably disposed at uniform angular spacing around the axis 2 and at the same distance therefrom; although other configurations may be chosen if so desired. For example, good results have been obtained in tests using three ducts such as 53 and 54 through the body portion 13, but the invention extends to cover embodiments having fewer than three ducts or more than three ducts.

Each of the ducts such as 53 and 54 is thus suitable for providing a hydraulic connection between the half chamber 9 and a flat volume 55 which is delimited in pressure-tight manner between the face 17 of the body portion 13 and a separator diaphragm 56 which is elastically flexible, pressure-tight, and preferably made from a non-magnetic material which may be identical to the material used for the measuring diaphragm 1.

The separator diaphragm 56 is placed over the face 17 and, like the diaphragm 1, has a peripheral zone 57 and a central zone 58 both of which are flat and perpendicular to the axis 2, with the peripheral zone 57 being annular and the central zone 58 being in the shape of a disk. These two zones are interconnected by an intermediate corrugated zone 59. The diaphragm 56 as a whole is symmetrical about the axis 2 as is the diaphragm 1.

The outer zone 57 of the separator diaphragm 56 has the same inner and outer diameters about the axis 2 as the zone 18 of face 17, and the zone 57 of the separator diaphragm 56 is pressed flat against the zone 18. On the other side of the annular zone 57 there is an annular ring 60 of substantially identical size, and the separator diaphragm 56 is fixed to the body portion 13 by welding the ring 60 to the separator diaphragm 56 and to the body portion 13 around the entire outer periphery 61 of the ring 60, the outer periphery 62 of the separator diaphragm 56, and the outer periphery 63 of the zone 18 of the face 17 where the face 18 meets the portion of reduced diameter 16 in the outer peripheral face 15 of the body portion 13. The weld is pressure tight.

The shape of the separator diaphragm 56 is such that when at rest it is at a distance from the face 17 so that the intermediate volume 55 extends between the face 17 and the corrugated zone 59 of the central zone 58 of the diaphragm 56. However, the central zone 58 may be elastically deflected relative to the peripheral zone 57 towards the face 17 such that the corrugated zone 59 and the central zone 58 come into close contact with the face 17 and in particular with the corrugations 19 thereon. To this end, it is advantageous for the corrugations of the diaphragm 56 to be made by directly stamping the diaphragm 56 against the face 17 of the body portion 13.

The ring 60 and the body portion 13 may be considered as being undeformable so the above-described assembly leaves only the separator diaphragm 56 free to move relative to the body portion 13. More precisely, only the corrugated zone 59 and the central zone 58 of the diaphragm are free to move relative to the face 17 of the body portion 13. The inside face of the diaphragm 56 which is in contact with the interior volume 55 (i.e. facing the corrugated zone 19 of the face 17) is designated 64, while the corresponding outside face thereof inside the ring 60 is designated 65. These two faces have the same area.

The outside face 65 in the presently-described embodiment of the invention constitutes a face for receiving one of the pressures to be compared, and to this end the body 7 delimits a pressure tight chamber 66 opposite the face 65 for receiving the corresponding fluid. In the example shown, this chamber 66 is delimited by a rigid cover 67 which comes into contact with the ring 60 over a plane annular face 69 which is symmetrical about the axis 2 and perpendicular thereto. The face 69 has an annular groove 70 therein which is likewise symmetrical about the axis 2 and which houses a sealing ring 68. The inside periphery 71 of the face 69 is circular and of substantially identical diameter to the inside diameter of the ring 60 and to the junction 72 between the peripheral zone 57 of the separator diaphragm 56 and the corrugated zone 59 thereof. This diameter is the same as the diameter of the junction 73 between the zones 18 and 19 of the face 17 of the body portion 13. The face 69 delimits the edge of a cavity which delimits the chamber 66 inside the cover 67. This cavity inside the cover 67 is accessible from the outside thereof by means of a coupling fitting 74 for coupling to a source of one of the fluids whose pressure is to be compared.

A substantially incompressible hydraulic fluid is used to transmit the pressure applied to the face 65 of the separator diaphragm 56 to the face 11 of the measuring diaphragm 1. The pressure is applied to the face 65 by the fluid which is inserted into the chamber 66 when the sensor is in operation. The incompressible hydraulic fluid completely fills the intermediate volume 55 between the separator diaphragm 56 and the face 17 of the body portion 13, the set of ducts such as 53 and 54, and the half chamber 9 when the separator diaphragm 56 and the measuring diaphargm 1 are at rest, i.e. have equal pressures on their opposite faces. A filling duct 75 is provided for this purpose through the body portion 13 and it is subsequently closed in a pressure-tight manner, e.g. by successively inserting a ball bearing 76 which is a force fit and then a plug 77 which is welded in a pressure-tight manner onto body portion 13 at the outlet of the duct 75 which is advantageously situated in the face 21 of the portion 13. The duct 75 extends radially from the said opening towards the axis 2 and encounters one of the ducts 53. The hydraulic fluid may advantageously be a silicone oil which has the advantage of viscosity that changes little with temperature. Otherwise a fluorided oil may be used, or indeed any other hydraulic fluid may be used without going beyond the scope of the invention.

The second portion 14 of the body 17 is exactly symmetrical to the portion 13 described above relative to the plane 5, except that inside the half chamber 10 facing the face 12 of measuring diaphragm 1, the face 78 of the body portion 14 is not symmetrical to the intermediate zone 29 of the face 24 of the body portion 13, but is complementary to the facing zone 12 of the diaphragm 1 where the diaphragm is corrugated. In other words, the two portions 13 and 14 of the body 7 are symmetrical apart from their respective zones which match the corrugations 6 of the diaphragm 1, since in order to match opposite sides of the same corrugations in the same thin diaphragm, the corrugations per se must be complementary. Nevertheless, the face 78 of the body portion 14 has its outer edge connected to the inside periphery 79 of a plane annular face 80 which bears flat against the peripheral zone 4 of the diaphragm 1 in a position which is symmetrical to the position of the peripheral zone 26 of the face 24 of the body portion 13. The face 79 ends with a peripheral rim 81 symmetrical to the outer rim 23 of the peripheral zone 26 to the face 24 of the portion 13. The diaphragm 1 is fixed to the two portions 13 and 14 of the body 7 by welding all the way around the juxtaposed outer peripheries 23, 25 and 81.

The body portion 14 has a blind hole 82 which is symmetrical to the blind hole 32 of the portion 13. The blind hold 82 has an insert 83 therein which is symmetrical to the insert 38 and which is welded in a pressure-tight manner to the portion 14 in the same manner as was described for welding the insert 38 to the body portion 13. The blind hole 82 thus has a cavity 84 which is isolated from the half chamber 10 as defined by the face 12 of the diaphragm 1 in its central zone 3 and in its corrugated zone 6, by the corrugated face 78 of the body portion 14, and by the insert 83.

Still symmetrically about the plane 5, the portion 14 has an outer face 85 corresponding to the face 17. The outer face 85 is fitted with a separator diaphragm 86 which is pressure-tight and elastically flexible and which is symmetrical to the separator diaphragm 56 when both diaphragms are in the rest position, i.e. when they have equal pressures on both faces. The diaphragm 86 is fixed to the body portion 14 by a welded on annular ring 87 with a continuous weld between the ring 87 and an annular peripheral zone 88 of the face 85, thus defining a flat intermediate volume 89.

The intermediate volume 89 communicates with the half chamber 10 by a set of hydraulic connection ducts such as 90 and 91, each of which is symmetrical to a corresponding hydraulic connection duct such as 53 or 54 respectively in the body portion 13.

As mentioned above with reference to the portion 13, the assembly constituted by the hydraulic connection ducts such as 90 and 91, the intermediate volume 89, and the half chamber 10 is filled when the sensor is manufactured with a substantially incompressible hydraulic fluid such as silicone oil and with the measuring diaphragm 1 and the separator diaphragm 86 in the rest position. Fluorided oil or other hydraulic fluids could also be used. The fluid is inserted via a filling duct 93 which is symmetrical to the filing duct 75 and which is subsequently sealed by the successively inserting a force fit ball bearing 94 and a plug 95 which is welded to the body portion 14.

The separator diaphragm 86 has faces 96 and 97 respectively facing the volume 89 and facing away therefrom, and of identical area to the corresponding faces 64 and 65 of the separator diaphragm 56. The face 97 thus receives the other of the two pressures to be compared.

To this end, the body 7 has a rigid cover 98 which is fixed thereto symmetrically to the cover 67, and which defines adjacent to the face 97 a chamber 99 which is symmetrical to the chamber 66. The chamber 99 has a fitting 100 analogous to the fitting 74 for receiving the second fluid whose pressure is to be compared with the pressure of the fluid received into the chamber 70 via the fitting 74.

In a manner analogous to the cover 67 in relation to the ring 60, the cover 98 is in contact under pressure with the ring 87 via a peripheral annular face 101 symmetrical to the face 69 of the cover 67 and with a sealing ring 102 housed in an appropriate groove. The sealed connection of the two covers is ensured by bolts 103 and 104 (and preferably more than just two such bolts) which are regularly distributed around the circumference of the sensor outside the outer peripheral face 15 of the body portion 13 and the corresponding outer peripheral face 109 of the body portion 14. The bolts such as 103 and 104 are threaded and pass through smooth holes in appropriate lugs such as 105, 106, 107 and 108 in the covers 67 and 98. The bolts lie parallel to the axis 2 and they interconnect the covers 67 and 98 by means of nuts 110, 111, 112, 113 which bear against the covers 67 and 98 and tend to urge them towards each other parallel to the axis 2, thus clamping the two body portions 13 and 14 between them under pressure.

It may be observed that the outer diameters 71, 72 and 73 of the ring 60, or the separator diaphragm 56 and of the face 17 of the portion 13 respectively and the corresponding diameters of the ring 87, the separator diaphragm 86 and the face 85 of the body portion 14 are greater than the diameter of the face 21 of the portion 13 which is identical to the diameter of the face 114 corresponding thereto in the body portion 14, and also greater than the diameters of the peripheries 23, 25 and 81, such that the force applied by the nuts 110 to 113 on the covers 67 and 98 is transmitted to the body portions 13 and 14 via the rings 60 and 87, which project radially beyond the faces 21 and 114 from the peripheries 23, 25 and 81, i.e. radially outside the weld zone between the measuring diaphragm and the body portions 13 and 14. The person skilled in the art will understand that by a suitable choice of these various diameters and of the forces applied by the nuts such as 110 to 113 on the two covers 67 and 98, it is possible to compensate the natural tendency of the portions 13 and 14 to expand radially under the effect of the pressure which is applied thereto by the nuts such as 110 to 113. This counter effect results from the action or the covers 67 and 98 on the projecting parts of the body portions 13 and 14. The purpose of this exercise is to avoid putting the measuring diaphragm 1 under radial tension.

An annular ring 115 surrounds the outer peripheral faces 15 and 109 of the body portions 13 and 14 respectively in between the covers 67 and 98, and joins these two peripheral surfaces in such a manner as to hide the welds between the diaphragm 1 and the two body portions 13 and 14. In order not to interfere with the above-described radial compensation, the ring 115 is mounted in such a manner as to slide freely axially over the body, with sufficient play relative to the covers 67 and 98 to move in the axial direction (gaps 116 and 117).

Given the dispositions which have just been described, the pressures applied in the chambers 66 and 99 respectively to the face 65 of the separator diaphragm 56 and to the face 97 of the separator diaphragm 86 are transmitted identically to respective faces 11 and 12 of the measuring diaphragm 1 via the hydraulic fluid contained in the volume 55, the ducts such as 53 and 54 and the half chamber 9 on the portion 13 side of the body and in the volume 89, the ducts such as 90 and 91 and the half chamber 10 on the portion 14 side of the body 7.

The hydraulic fluid is chosen to be as incompressible as possible, so the entire pressure difference between the chambers 66 and 99 is converted, from an initial state of the sensor corresponding to each of the diaphragms 1, 56 and 86 being in an equilibrium rest position, by the respective central portions of all three diaphragms moving together parallel to the axis 2 either towards the chamber 99 if the excess pressure is in the chamber 66 or the other way if the excess pressure is in the chamber 99.

The degree to which the central portions of the three diaphragms are displaced, and in particular the degree to which the measuring diaphragm 1 is displaced, is representative of the pressure difference between the chambers 66 and 99, and means described below are provided to measure this displacement of the central zone 3 of the measuring diaphragm 1, and to indicate the direction in which it has been displaced.

To this end, the central zone 3 is fixed, e.g. by welding, to two identical magnetic cores 118 and 127 which are disposed on either side of the central portion 3, i.e. each core is in a corresponding one of the half chambers 9 and 10. The cores are symmetrical to each other and they are mutually aligned along the axis 2.

The magnetic core 118 is more clearly visible in FIG. 2, in which it can be seen that it has a sleeve shaped zone 119 delimited by an inside peripheral face 120 and an outside peripheral face 121 both of which faces are cylindrical about the axis 2 and at its end remote from the plane 5 by an annular plane face 122 interconnecting the faces 120 and 121 perpendicularly to the axis 2. The end of the sleeve 119 which is closer to the plane 5 terminates in an outwardly projecting annular collar 120 which is symmetrical about the axis 2, which has an outer face 123 which is cylindrical about the axis 2 and which is connected to the outer face 121 of the sleeve 119 by a plane annular face 124 facing away from the plane 5 and which is connected to the inside peripheral face 120 of the sleeve 119 by an annular face 125 which is symmetrical about the axis 2, its plane, and is for the most part perpendicular to the axis 2. However, the face 125 has a rim 126 at its junction with the outer edge 123, which rim is annular about the axis and faces the plane 5.

The rim 126 is used for fixing the core 118 on the face 11 of the diaphragm 1 by the electric discharge welding method, which is known per se.

It may be observed that the diameter of the peripheral outer face 123 of the collar-shaped zone 120 of the core is not greater in diameter than the diameter of the central zone 3 of the diaphragm 1 so as to ensure that it may be fixed thereto. Likewise, the collar-shaped portion 120 is of a diameter capable of being received in the set back face 52 of the collar-shaped zone 46 of the insert 38 fitted inside the body portion 13. Additionally, the diameter of the outer peripheral face 121 of the sleeve 119 is less than the diameter of the inside peripheral face 41 of the sleeve 40 of the insert 38, with the distance between the faces 122 and 124 of the collar 120 in a direction parallel to the axis 2 being less than the distance between the face 44 and the set back face 52 of the insert 38 with the overall thickness of the collar 120 of the core 118 parallel to the axis 2 between the face 124 and the rim 126 being less than the distance between the face 11 of diaphragm 1 in the central zone 3 thereof and the set back face 52 on the insert 38 when the measuring diaphragm 1 is at rest, whereby starting from this initial state, the sleeve 119 of the core 118 may be engaged inside the sleeve 40 of the insert 38 with its face 122 being situated between the respective positions of the faces 48 and 44 along the axis 2, and is capable of moving further into the insert 38 when the central zone 3 of the diaphragm 1 is deflected towards the body portion 13. Preferably, the thickness of the collar 120 of the core 118 as defined above, is such that its face 124 comes into contact with the face 52 to define an end stop at the end of the largest allowable displacement of the diaphragm 1 in this direction, i.e. when the corrugations 6 are pressed against the corrugations of the intermediate zone 29 of the face 24 of the body portion 13. Also preferably, the distance parallel to the axis 2 between the faces 122 and 124 is close to the distance parallel to this axis 2 between the face 44 and the set back face 52 of the insert 38, but less than said distance so that when the core abuts against the end stop thus constituted, the tip 122 of the core is close to the end face 44 of the insert.

These various dimensions are nevertheless chosen in such a manner that the displacement of the core 118 inside the insert 38 remains compatible with the corresponding flow of fluid inside the half chamber 9.

The core 127 is identical to the core 118 and in particular has a sleeve 128 which corresponds to the sleeve 119 of the core 118 and which, engaged in the sleeve 129 of the insert 83 (corresponding to the sleeve 40 of the insert 38) penetrates further into the sleeve 129 as the central zone 3 of the diaphragm 1 moves towards the body portion 14. In addition, the core 127 has a collar 130 corresponding to the collar 120 of the core 118 and which serves firstly to fix the core to the diaphragm 1 by being welded to the central zone 3 and secondly to constitute an end stop limiting the penetration of the core into the sleeve 129 of the insert 83 by co-operating with a zone 131 on the insert 83 corresponding to collar 46 of the insert 38. On abutting the end stop, the corrugations 6 of the diaphragm 1 are pressed closely against the corrugated face 78 of the body portion 14.

Preferably, the intermediate volumes 55 and 89 and the respective volumes of the half chambers 9 and 10 are all similar so that when the measuring diaphragm 1 abuts against the body portion 13 or 14 the separator diaphragm 86 abuts against the face 85 of the body portion 14 or the separator diaphragm 56 abuts against the face 17 of the body portion 13 as the case may be.

It may be observed that displacing the central zone 3 of the diaphragm in a given direction along the axis 2 causes the sleeve of one of the magnetic cores to penetrate further into the sleeve of the associated insert while causing the sleeve of the other magnetic core to move further out from the sleeve of the insert associated therewith. The magnetic cores 118 and 127, and the inserts 38 and 83 are of such a size and are so positioned that, with reference to the rest position of the measuring diaphragm 1, when one of the cores abuts against the associated insert the other core does not completely leave the insert with which it is associated, thus establishing a minimal degree of engagement, e.g. of approximately one half of the respective lengths of the sleeves, said sleeve lengths being measured along the axis 2.

To measure the position of each of the cores 118 and 127 inside the corresponding inserts 38 and 83, in the direction parallel to the axis 2, there are two simple inductors 132 and 133 mounted inside the cavities 39 and 84 respectively. These inductors are identical and occupy symmetrical fixed positions in the body with respect to the plane 5.

The structure of the inductor 132 is identical to that of inductor 133 and is described with reference to FIGS. 2 and 3 in which 134 designates a single winding having two electrical connection wires 135 and 136, and 137 represents a magnetic frame for the winding. The magnetic material is advantageously a ferro-nickel alloy and the same alloy is preferably used to constitute the moving cores 118 and 127. Other alloys may also be used for these magnetic components.

The frame 137 in the preferred embodiment is in the form of a two-part welded assembly, one of the parts 138 being in the form of a stamped cup and receiving the winding 134 inside itself, and the other part 139 being in the form of a washer which holds the winding 134 inside the cup 138.

The cup has a flat annular bottom 140 which is symmetrical about the axis 2 and perpendicular thereto. The inside peripheral edge 141 of the annular bottom 140 is of larger diameter and the outside peripheral face 42 of the sleeve 40 of the insert 38, but is nevertheless close thereto so that the cup 130 can be fitted to the outer peripheral face 42 by means of its inside periphery 141 with a sleeve 142 of non-magnetic and electrically insulating material inserted therebetween. The sleeve 142 completely covers the outside face 42 from its collar face 48 to its tip face 45.

The bottom wall 140 of the cup 138 has an outer peripheral face 143 which is likewise symmetrical about the axis 2 and which leads to an outer peripheral wall 144 of the cup 138. The wall 144 is delimited in particular by an interior peripheral face 145 and an outer face 146 both of which are cylindrical about the axis 2, and has a diameter which is less than the diameter of the peripheral face 33 of the blind hole 32 in the body portion 13. The wall 144 extends away from the bottom 140 in a direction going away from the central plane 5. The bottom 140 is disposed in the proximity of the face 48 of the collar 46 of the insert 38 but does not come into contact therewith. It is subdivided by slots 147 which are parallel to the axis 2 giving rise to a series of tabs such as 148 which are relatively long parallel to the axis 2 and relatively short in a direction circumferential thereto. These tabs alternate with tabs 149 which are shorter parallel to the axis 2 and which extend over a wider arc thereabout.

The slots 140 are open at their ends which are distant from the central plane 5 and are closed at their opposite ends in the immediate vicinity of the bottom wall 140. The relatively long tabs 148 are sufficiently thin to be springy while the relatively short tabs 149 are comparatively rigid.

The comparatively rigid tabs 149 are used for providing a mechanical link and magnetic continuity between the bottom wall 140 and the washer 139 which is of similar shape to the bottom wall 140. The cylindrical outer periphery 150 of the washer 139 has the same diameter as the outer peripheral face 146 of the wall 144 of the cup 138 and has an internal periphery 151 which is also cylindrical about the axis 2 and whose diameter is equal to the internal periphery 141 of the bottom wall 140. In order to mechanically link these parts without interfering with the possibility for the relatively flexible tabs 148 of bending elastically, the outer periphery 150 of the washer 139 has notches 152 around each of the relatively flexible tabs 148 leaving empty space all round the relatively flexible tabs 148 while coming into contact with each of the relatively rigid tabs 149 in a zone 153 thereof which is furthest from the plane 5. The washer 139 and the relatively rigid tabs 149 are welded, e.g. by electrical discharge.

As shown in FIG. 3, the comparatively flexible tabs 148 project beyond the washer 139 and, their tips 154 which are furthest from the plane 5 and thus which project beyond the washer 139 are welded to the welded to the zone 36 of the face at the bottom 35 of the blind hole 32, thereby mounting the frame 137 inside the cavity 39 of the body portion 13.

Given the resilient flexibility of the tabs 148, any thermal deformation to which the body portion 13 is subjected is practically not transmitted to the bottom wall 140 or to the rigid tabs 149 of the cup 138 and thus to the washer 139. In other words such temperature deformations are practically without effect on the magnetic characteristics of the frame 137 in spite of the magnetostrictive properties of the material which generally constitutes such a frame.

By making the sleeve 142 from material which is elastically compressible, it is also possible to avoid transmitting mechanical stress to the sleeve 40 of the insert 38 to the interior peripheries 141 and 151 of the bottom wall 140 and the washer 139 of the cup 138. The winding 134 is inserted inside the frame 137 between the two washer 155 and 156 made of electrically insulating material, with the washer 155 adjacent to the washer 139 and the washer 156 adjacent to the bottom wall 140 of the cup 138. A resilient washer 157 is inserted between the bottom wall 140 and the washer 156 in order to resiliently urge the winding 134 inside the frame 137 against the washer 139 and away from the wall 140 along the axis 2. The washer 155,156 and 157 and the winding 134 itself have respective inside peripheries 158, 159, 160 and 161 of a diameter which is substantially identical to the inside peripheries 141 and 151 of the bottom wall 140 of the cup 138 and of the washer 139 respectively to enable the entire assembly to be placed without play on the sleeve 142.

The two electrical connection wires 135 and 136 of the winding 134 leave the frame 137 via one of the slots 147 in the wall 144 of the cup 138 and leave the portion 13 of body 7 via a channel 161 provided for this purpose through said portion 13 and extending radially relative to the axis 2. This channel constitutes another exception to the exact symmetry of the body portion 13 about the axis 2. The channel 161 opens out at one end in the junction between the peripheral face 33 of the blind hole 32 and the stepped portion 34, and at its other end in the face 21 of the body portion 13. Inside the channel 161 there is a lining 162 in the form of a tube of electrically insulating material.

Two terminals such as 164 are fixed on the face 20 of the body portion 13 by means of electrically insulating sleeves 163. These terminals connect the wires 135 and 136 respectively via a hole 92 in the ring 115 to a source 165 which provides a determined voltage $-V$ and to voltage measuring means 166, both being of types known to the person skilled in the art. This connection is shown in more detail in FIG. 4.

The inductor 133 lodged in the cavity 84 in the body portion 14 is identical to the inductor 132 which has just been described. In particular, it comprises a single winding 167 identical to the winding 134, a frame 168 identical to the frame 137 and identically mounted in the corresponding cavity and identically receiving the associated winding 167.

The winding 167 has two electrical conductors 169 and 170 which correspond respectively to the conductors 135 and 136 and which leave the body portion 14 via one of the slots 171 in the armature 168 which corresponds to the slots 147 in the armature 137. Thereafter they pass through a channel 172 which is provided through the body portion 14 in a symmetrical disposition to that of the channel 161 and which is lined with a tube 173 similar to the tube 162. Like the body portion 13, the body portion 14 has two terminals 175 mounted insulating sleeves 174 and serving to connect the conductors 169 and 170 to the voltage source 165 and to the voltage measuring means 166 via the hole 92 and as shown in FIG. 4.

In FIG. 4 it can be seen that the voltage source 165 injects a voltage $+V$ into the conductor 169 while the connection between the measuring means 166 to the conductor 170 is common with its connection to the conductor 136.

As is known to the person skilled in the art, each of the two inductors 132 and 133 has an impedance which is a function of the position occupied therein by the associated magnetic core 118 or 127 or 127 along the axis 2 and within the corresponding winding 134 or 137. The magnetic cores serve to close the magnetic circuit of a corresponding frame 137 or 168 through the insert 38 or 83 in the preferred embodiment of the invention as just described. In other words, these positions correspond for the magnetic flux to crossing a flux gap of varying size between the tip of the magnetic core and the most distant part of the magnetic frame from the plane 5. For example, the flux gap extends between the tip 122 of the core 118 and the washer 139 of the frame 137.

Since the windings 134 and 167 are identical and since the magnetic cores 118 and 128 are symmetrical as are the frames 137 and 168, the application of identical pressures on the face 65 of the separator diaphragm 56 (i.e. in the chamber 66) and on the face 97 of the separator diaphragm 86 results in the measuring diaphragm 1 being in the rest position (i.e. with the cores 118 and 128 being symmetrically placed about the plane 5) thereby giving rise to identical positions relative to their associated inductors 132 and 133. Thus, identical pressures give rise to identical impedances in the inductors 132 and 133 and thus to zero voltage at the measurement means 166. However, if the pressure in the chamber 66 and 99 are different the diaphragm 1, and consequently both magnetic cores 118 and 127 move parallel to the axis 2 towards that one of the chambers 66 and 99 in which there is the lesser pressure, thereby increasing the impedance of one of the windings while decreasing the impedance of the other. Given the bridge connection of the windings 134 and 167, this results in the application of a voltage to the measuring means 166 in which the phase is representative of the sign of joint displacement of the two cores along the axis 2 and in which the amplitude is representative of the value of said displacement, which is itself representative of the value of the pressure difference between the chambers 66 and 99. The circuit 166 processes this voltage to deliver a signal representative of the difference of the inductance of the two windings.

The implementation of the invention which has just been described constitutes a preferred implementation thereof. However, when the nature of the fluids whose pressures are to be compared makes it possible, it would also be possible without going beyond the scope of the invention to apply the pressures in question directly to the opposite faces 11 and 12 of the measuring diaphragm 1 without requiring the addition of separator diaphragms 66 and 86 and the intermediate hydraulic channels as described above. The person skilled in the art would be able to apply the necessary modifications without needing to employ inventive activity. In this case, it would be particularly advantageous to keep the windings 132 and 133 hermetically sealed from the fluids acting on the two faces of the measuring diaphragm 1 by means of non-magnetic means comparable to the inserts 38 and 83 which are interposed between each inductor and its associated core. It would similarly be advantageous to mount the inductor frames resiliently as described, at least under circumstances where the sensor is intended to operate under varying temperature conditions.

Similarly, the comparator means between the respective inductors 132 and 133 could be selected freely by the person skilled in the art without going beyond the scope of the present invention.

I claim:

1. An inductive differential pressure sensor comprising:
    a rigid body delimiting an internal chamber;
    a flexible measuring diaphragm subdividing the chamber into half chambers which are sealed from each other;
    means for appying two pressures to be compared to respective ones of the two half chambers, a central zone of the diaphragm being suitable for being displaced by a value representative of the value of the difference between the two pressures along a reference direction perpendicular to a reference plane which is fixed relative to the body and which is defined by the general plane of the diaphragm in its rest position said body being at least partially symmetrical about said reference plane; and
    electromagnetic means for measuring the displacement by induction, said means comprising:
    two identical magnetic cores fixed to the central zone of the diaphragm and disposed symmetrically on either side thereof in each of the half chambers and mutually aligned parallel to the reference direction;
    two identical magnetic cores fixed to the central zone of the diaphragm and disposed symmetrically on either side thereof in each of the half chambers and mutually aligned parallel to the reference direction;
    two identical simple inductors fixed to the body in symmetrical positions on either side of the reference plane and mutually aligned parallel to the reference direction, each inductor surrounding a respective one of the cores so as to present an impedance which is a function of the position of the core relative to the inductor;
    wherein the body has means fixed therein for defining around each inductor a cavity which is sealed from the internal chamber, each of said cavities being maintained at substantially equal and constant pressure, said means being non-magnetic at least where they extend between the magnetic cores and the corresponding inductor windings, and wherein each inductor includes a frame within the corresponding cavity and is carried by the body inside the said cavity by means of a plurality of resilient tabs connected at one end to the frame and at the other end to the body; and
    electrical connection means for connecting the two inductors with means for measuring the difference of their impedances, whereby said difference is representative of the differential pressure and substantially independent of the temperature.

2. A sensor according to claim 1 wherein the said tabs form an integral part of the frame and are separated from the rest thereof by slots, the tabs being oriented substantially parallel to the reference direction.

3. A sensor according to claim 1 wherein the means for applying the two pressures to be compared to the respective half chambers comprise:
    two external faces of the body;
    two flexible separator diaphragms which are identical to each other and which are placed over each of the said external faces of the body and which delimit therewith in a pressure tight manner respective intermediate volumes, the two separator diaphragms having the same surface areas facing their respective intermediate volumes and the same surface areas facing respective external volumes suitable for receiving respective ones of the pressures to be compared:
    two independent hydraulic networks, each connecting a respective one of the half chambers to a respective one of the intermediate volumes; and
    a substantially compressible hydraulic fluid filling each of the said networks, the half chambers, and the intermediate volumes;
    and wherein the body delimits facing the outer faces of the two separator diaphragms two respective fluid reception chambers for receiving respective ones of the pressures to be compared.

4. A sensor according to claim 1 which further includes means for measuring the difference between the impedances of the two inductors.

* * * * *